US 6,583,965 B1

(12) United States Patent
Forbord et al.

(10) Patent No.: US 6,583,965 B1
(45) Date of Patent: Jun. 24, 2003

(54) INERTIA RING FOR IMPROVED ROTATIONAL VIBRATION PERFORMANCE

(75) Inventors: Kent J. Forbord, St. Louis Park, MN (US); Michael D. Schroeder, Webster, MN (US); Chayakorn Thanomsat, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/552,056

(22) Filed: Apr. 19, 2000

Related U.S. Application Data
(60) Provisional application No. 60/130,292, filed on Apr. 21, 1999.

(51) Int. Cl.$^7$ .............................................. G11B 33/08
(52) U.S. Cl. ................................................... 360/294.4
(58) Field of Search ........................... 360/294.4, 97.02, 360/97.01

(56) References Cited

U.S. PATENT DOCUMENTS

| | | | | |
|---|---|---|---|---|
| 4,491,888 A | | 1/1985 | Brown et al. ................. 360/97 |
| 4,894,735 A | * | 1/1990 | Takahashi et al. ........ 360/97.01 |
| 5,214,549 A | | 5/1993 | Baker et al. .............. 360/97.02 |
| 5,282,100 A | | 1/1994 | Tacklind et al. .......... 360/97.02 |
| 5,400,196 A | * | 3/1995 | Moser et al. ............. 360/97.02 |
| 5,414,574 A | * | 5/1995 | Boutaghou et al. ....... 360/97.01 |
| 5,469,311 A | | 11/1995 | Nishida et al. ........... 360/97.02 |
| 5,517,375 A | | 5/1996 | Dion et al. ............... 360/98.07 |
| 5,546,250 A | * | 8/1996 | Diel ........................ 360/97.02 |
| 5,587,855 A | | 12/1996 | Kim ........................ 360/97.02 |
| 5,598,306 A | | 1/1997 | Frees et al. ............... 360/97.02 |
| 5,602,697 A | | 2/1997 | Jeong et al. .............. 360/97.02 |
| 5,677,813 A | | 10/1997 | Yoshida et al. ........... 360/97.02 |
| 5,781,373 A | | 7/1998 | Larson et al. ............. 360/97.02 |
| 5,793,566 A | * | 8/1998 | Scura et al. .............. 360/97.02 |
| 5,898,537 A | * | 4/1999 | Oizumi et al. ............ 360/97.01 |
| 5,903,540 A | | 5/1999 | Ro et al. ..................... 369/263 |
| 5,956,213 A | * | 9/1999 | Dague et al. ................ 360/105 |
| 6,052,255 A | * | 4/2000 | Kawabe et al. ........... 360/97.02 |
| 6,062,104 A | * | 5/2000 | Allport ........................ 74/574 |
| 6,122,138 A | * | 9/2000 | Khanna et al. ........... 360/97.01 |
| 6,122,139 A | * | 9/2000 | Sri-Jayantha et al. .... 360/97.02 |
| 6,243,228 B1 | * | 6/2001 | Yoshida et al. ........... 360/97.02 |
| 6,388,413 B1 | * | 5/2002 | Ng et al. ..................... 318/560 |
| 6,438,094 B1 | * | 8/2002 | Mahr et al. ................. 369/253 |

FOREIGN PATENT DOCUMENTS

| | | |
|---|---|---|
| EP | 0780845 | 12/1996 |
| JP | 10-214480 | 11/1998 |

\* cited by examiner

*Primary Examiner*—William Korzuch
*Assistant Examiner*—Angel Castro
(74) *Attorney, Agent, or Firm*—Jennifer M. Buenzow

(57) ABSTRACT

A disc drive includes a base and a disc rotatably attached to the base. The disc drive also includes an actuator assembly rotatably attached to said base and a device for moving the actuator assembly. A cover is attached to the base. The combination of the cover and base form a disc enclosure for enclosing the disc the actuator assembly and the device for moving the actuator assembly. An inertia ring is attached to the disc enclosure for increasing the moment of inertia of the base and cover. The inertia ring may be attached to the cover or to the base. The inertia ring may be formed of a material which is more dense than the cover or more dense than the base. The inertia ring may also be formed integral with the base or the cover. The inertia ring may also be formed such that the material is positioned near the periphery of the base and attached cover. A damped interface between the inertia ring and the base or cover may further reduce movement of the base with respect to the actuator.

12 Claims, 11 Drawing Sheets

INERTIA RING FOR IMPROVED ROTATIONAL VIBRATION PERFORMANCE

RELATED APPLICATION

This application claims the benefit of U.S. Provisional Application Ser. No. 60/130,292, filed Apr. 21, 1999 under 35 U.S.C. 119(e).

FIELD OF THE INVENTION

The present invention relates to the field of mass storage devices. More particularly, this invention relates to an apparatus and method for vibrational dampening of the actuator assembly and the base of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

When, however, electricity is applied to the voice coil to generate a drive force to relocate the transducer attached to the rotary actuator assembly, the permanent magnet and yoke are subjected to the resulting reaction force. The permanent magnet and yoke are attached to the base of the disc drive. The reaction force acts through the permanent magnet and yoke to excite the base. Simply put, the base is vibrated when the voice coil is used to move the actuator and transducers during a seek operation. As a result, during positioning, there occurs a relative displacement between the transducer supported by the actuator assembly and the track on the disc. This causes the transducer to move off-track. In addition, access times to data can increase. At the end of a seek, the transducer must settle to a position over a track. If the disc and attached base are vibrating, the track below the transducer may be moving thereby preventing the transducer from "settling". As a result, the time required for positioning increases, thereby affecting positioning performance such as access time. Tracks are becoming narrower and narrower as tracks are being placed closer and closer together. The problems of settle time are also exacerbated by the decreased widths.

After a seek, the disc drive may be commanded to write data to a track. If the transducer is vibrating or moving beyond a selected limit, then a write fault is declared to prevent overwriting or corruption of an adjacent track. The selected limit may be called a write fault threshold or can also be referred to as an on cylinder limit. As tracks get narrower and narrower, it becomes increasingly more important to reduce the relative movement between the track on the disc and the transducer to lessen the chance of read errors or write faults. In most cases, when a write fault occurs, the actuator remains on track until the transducer is repositioned over the proper sector. The actuator remains on track for at least one revolution. When the transducer is again positioned over the proper sector, a write can occur provided that the actuator is within the write fault threshold. If not within the write fault threshold at the target time, the procedure of waiting on track and retrying a write is repeated either for a selected number of revolutions until the actuator is within the write fault threshold at the target time. Then a write can occur. Low levels of write fault errors are tolerable or acceptable. However, when too many write faults occur over a given amount of time, the performance of the disc drive degrades. In summary, when an excessive number of write fault errors are encountered over a given amount of time, the average seek time degrades significantly.

In the past, several approaches have been used to try and minimize the movement of the base as it reacts to the driving force produced by the voice coil motor. The approaches all use dynamic weights. In other words, the weights move significantly with respect to the disc drive base. Such approaches can also have problems. There is always a distinct possibility that the movement may cease over time. In other words, the rings or weights or comer weight may become stuck. The result is that all of the sudden a disc drive may begin to produce large numbers of read and write errors. The disc drive, simply put, would be less reliable. There is also a chance that there may be particles generated from two parts rubbing whenever one part is moving with respect to another. Such particles can cause disc crashes when they are within the disc enclosure.

Quick and precise positioning requires the reduction of the vibration of the magnetic disc apparatus caused by the driving reaction force to the voice coil motor. What is needed is a disc drive which has is less susceptible to the reaction forces. This will improve settling characteristics after a seek from a first track on the disc to a target track on the disc and will improve track following operations of the disc drive. In other words, there is a need for a disc drive that has less relative motion between the actuator assembly and the base while under any type of servo control that requires corrections to be implemented with the voice coil motor. There is also a need for a static solution so that the resulting disc drive is more reliable over the life of the drive. Also needed is a device that can be assembled using current assembly techniques.

SUMMARY OF THE INVENTION

The inventive disc drive includes a bead disc enclosure, and a device for increasing the inertia of the head disc enclosure attached to the head disc enclosure. The disc drive includes a base and a disc rotatably attached to the base. The disc drive also includes an actuator assembly rotatably attached to said base and a device, such as a voice coil motor, for moving the actuator assembly. A cover is attached to the base. The combination of the cover and the base form a disc enclosure for enclosing the disc, the actuator assembly and the voice coil motor. An inertia ring is attached to the disc enclosure for increasing the moment of inertia of the base and cover. The inertia ring may be attached to the cover or to the base. The inertia ring is generally formed of a high density material. In some embodiments, the inertia ring may also be formed integral with the base or the cover. The inertia ring may also be formed and positioned such that most of the material of the inertia ring is positioned near the periphery of the base and attached cover. The inertia ring may be formed to attach to the cover so that the ring fills a void between the disc and the attached cover.

Advantageously, the inertia ring reduces the vibration of the magnetic disc apparatus from the driving reaction force to the voice coil rotor. In other words, the added mass and position of the mass near the periphery of the disc drive makes it less susceptible to the reaction forces. Settling characteristics after a seek from a first track on the disc to a target track on the disc is improved. Track following operations of the disc drive are also improved. The disc drive has less relative motion between the actuator assembly and the base while under ally type of servo control which implements course corrections using a driver such as a voice coil motor. The solution is also static. In other words, the inertia ring does not move substantially with respect to the remaining portion of the disc drive. As a result, the disc drive is more reliable over its life. The addition of the inertia ring to the disc drive during manufacture can easily be accommodated using current assembly techniques.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
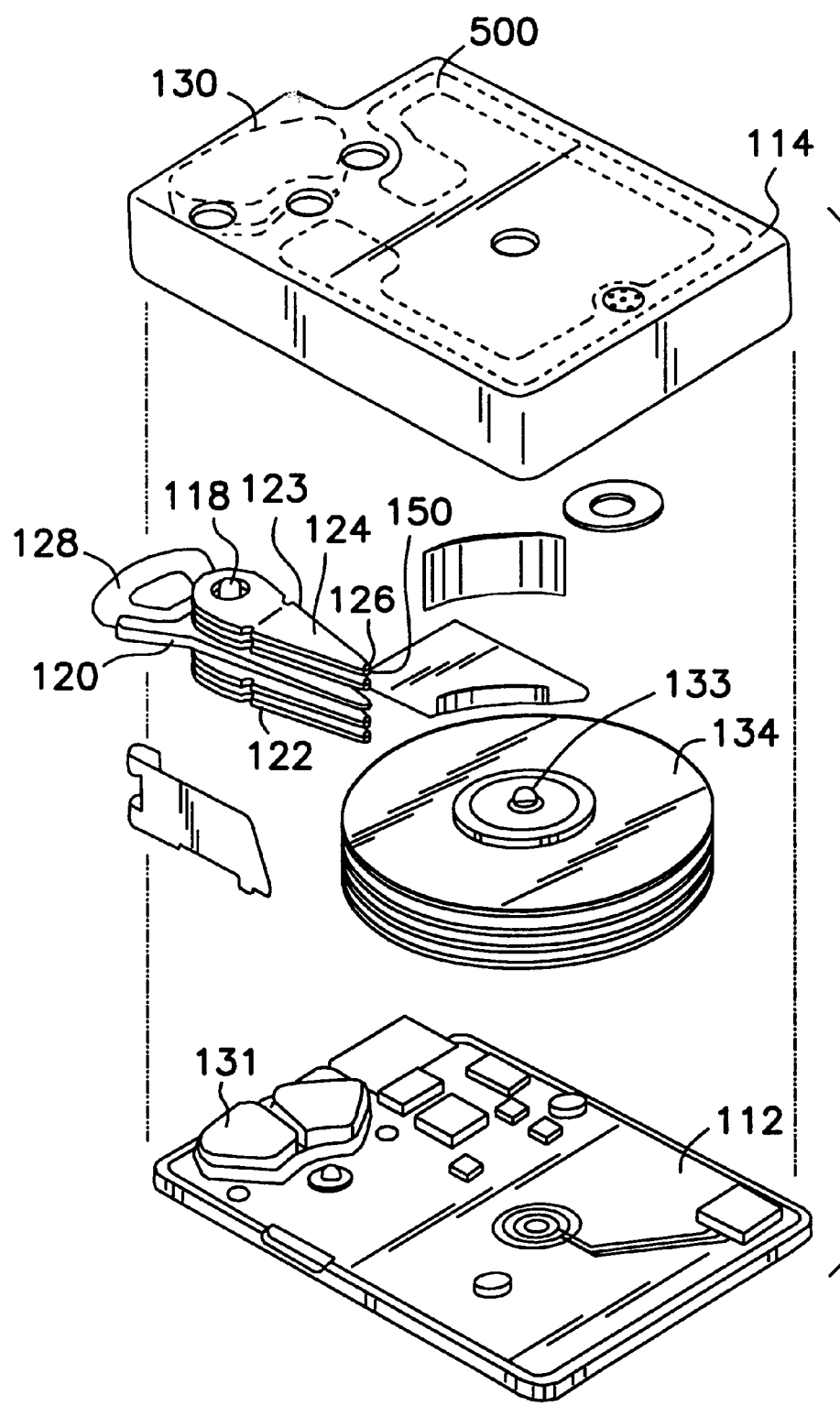
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
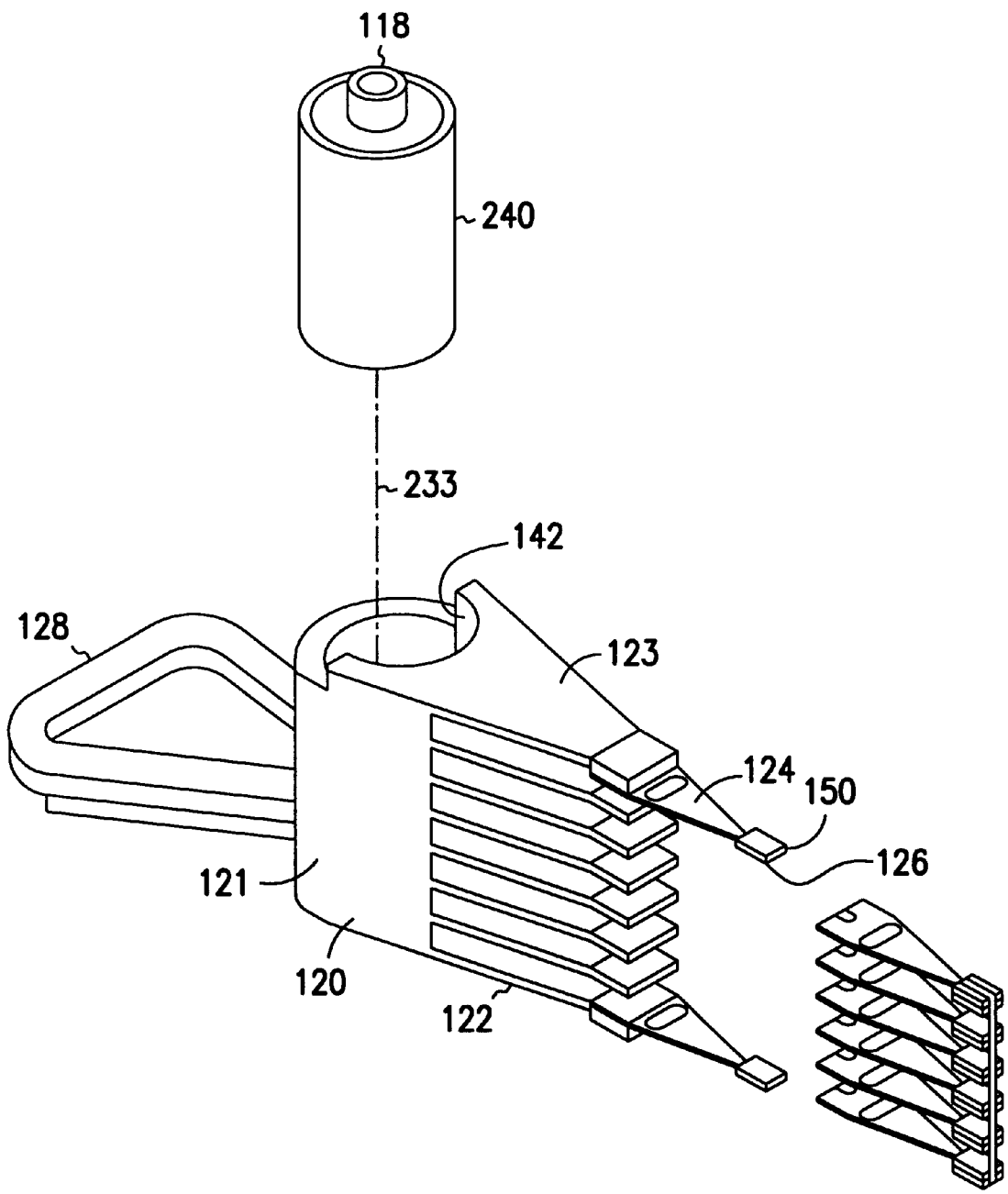
FIG. 2 is an exploded view of the actuator bearing cartridge and the actuator arm assembly of a disc drive.

FIG. 2 details the actuator arm assembly 120 in an exploded view. Each of the arms 123 of the E block or comb assembly 122, except the arms 123 on the top and bottom of the E block 122, carry two load springs. In this particular disc drive 100, there is a slider for both the top and bottom fingers of the E block 122 have only one load spring 124 since these are used for the top surface of the top disc and the bottom surface of the bottom disc in the stack of discs 134. Attached to the load springs 124 are sliders 126 which include magnetic transducers which magnetize the surface of the disc 134 to represent and store desired data. As is well known in the art of disc drives, each of the discs has a series of concentric tracks onto which the magnetic information is recorded. The sliders 126 and the magnetic transducers incorporated therein are moved over the surface of a particular disc 134 so that a magnetic representation of data can be stored in any of the tracks on the disc 134. In this particular disc drive 100, the transducer movement is rotational and about the actuator shaft 118. Rotating the actuator arm assembly 120 causes the slider 126 and the transducer therein to be repositioned over surface of the disc 134.

FIG. 2 also shows that the actuator arm assembly 120 includes a bearing cartridge 240. The bearing cartridge is cylindrical in shape and includes the actuator shaft 118 about which the actuator arm assembly rotates. The actuator arm assembly 120 has a first opening or bore 142 therein. The bearing cartridge 240 fits within the bore 142 in the actuator arm assembly 120.

Figure 3:
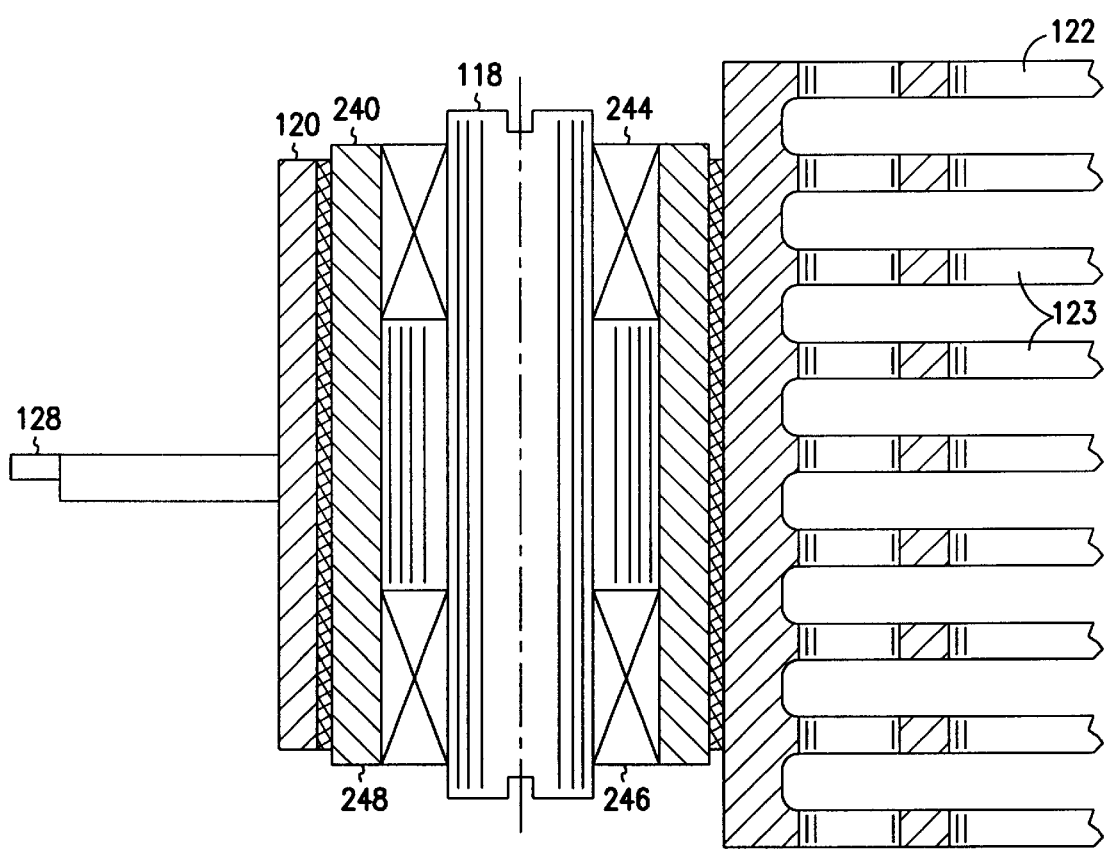
FIG. 3 is a sectional view of the actuator bearing cartridge and the actuator arm assembly of a disc drive.

FIG. 3 further details the bearing cartridge 240 and its attachment to the actuator arm assembly 120. The bearing cartridge 240 is comprised of a first bearing set 244, a second bearing set 246, an outer sleeve 248 and the shaft 118. The actuator shaft 118, the first bearing set 244, the second bearing set 246 and the outer sleeve 248 are made of the same material so that when the bearing cartridge 240 is heated during the operation of the disc drive 100, all of the components have the same coefficient of thermal expansion.

Figure 4:
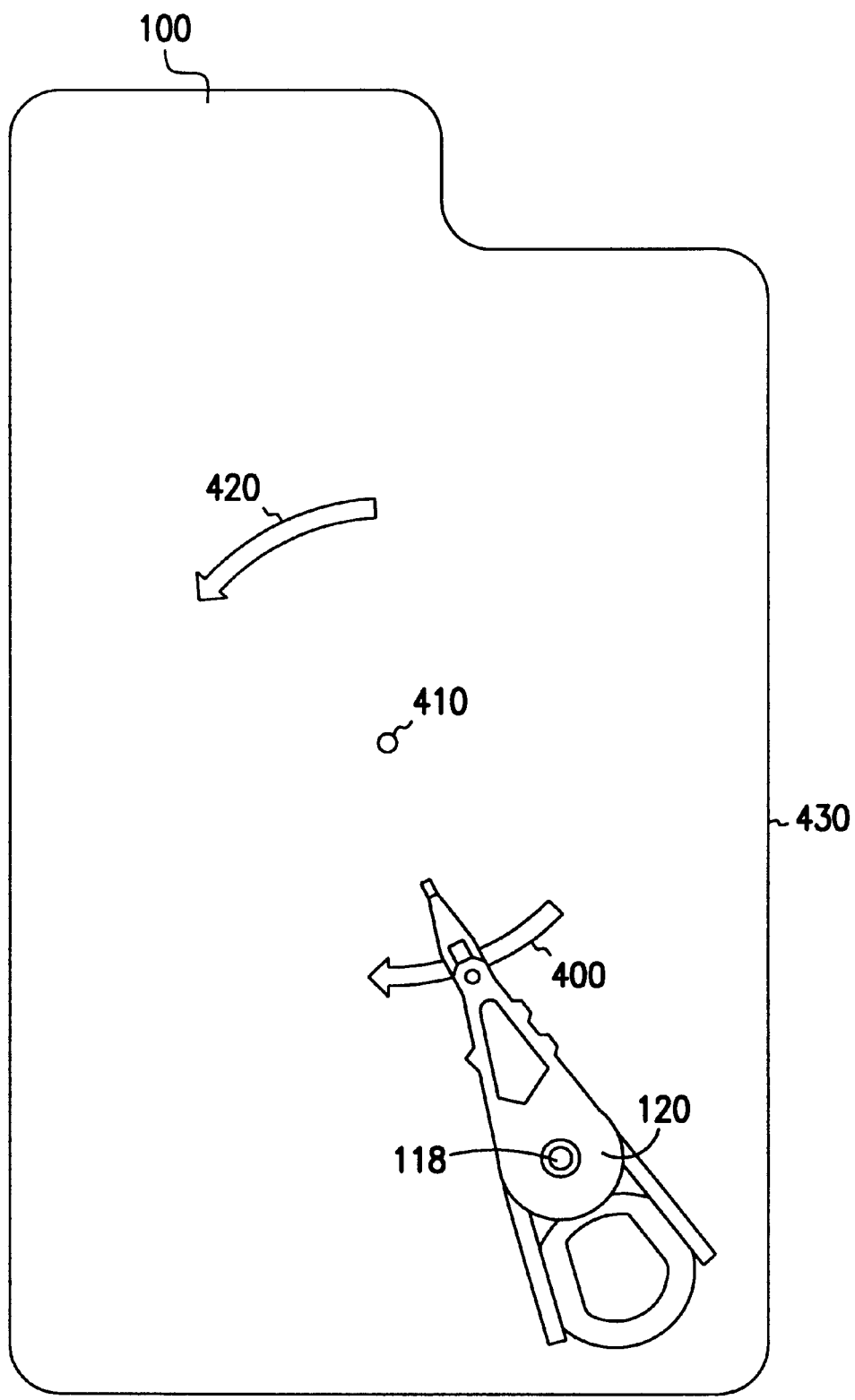
FIG. 4 is a top diagrammatic view of the disc drive having a first arrow representing the driving force on the actuator and having a second arrow showing the reaction force of the base and discs attached thereto.

FIG. 4 is a top diagrammatic view of a disc drive 100. The disc drive 100 includes an actuator assembly 120 which pivots about shaft 118 during seeks where the transducer head 150 is moved from a first track to a second track on a disc 134. In this particular diagrammatic diagram, the transducer 150 and the disc 134 are not shown for the sake of clarity. The actuator is driven by the voice coil motor during a seek. Basically, the actuator 120 is accelerated as it is moved from one position to a second position and when it is stopped over or near a target track on the disc 134. The acceleration or deceleration of the actuator assembly 120 results in a force applied to the actuator as represented by arrow 400. The base and other portions of the disc drive 100 react to the force 400 by producing a reactionary force represented by the arrow 420 in FIG. 4. As is well known, force equals mass times acceleration. The force represented by arrow 400 will produce an equal reactionary force represented by 420 which causes the deck or disc drive to move dependent on its mass, inertia and boundary conditions. The actuator is a relatively light mass which undergoes large accelerations. The base and rest of the disc drive 100 has a much larger mass than the actuator assembly 120. Since the mass of the base is larger than the mass of the actuator, the reaction force causes less acceleration of the base. The movement of the base will also be less. The idea behind the invention is to place an inertia ring 500 onto the disc drive 100 to increase the mass and inertia of the disc drive 100 and, therefore, lessen the acceleration or movement of the base. A damped interface between the inertia ring and the base or cover may further reduce acceleration or movement of the base with respect to the actuator.

The forces placed on the disc drive 100 are rotational in nature and, therefore, tend to make the disc drive rotate about a central axis depicted by reference numeral 410 in FIG. 4. The inertia ring 500 is designed to place most of the weighted material out toward the periphery of the disc drive 100 since this increases the moment of inertia of the disc drive 100. When applying rotary forces to a mass such as a disc drive 100, a torque or force at a distance is produced. Torque may be expressed as the inertia of the object times the angular acceleration. This is the rotational interpretation of Newton's second law. Mathematically, it can be shown as:

$$T = J \times \alpha,$$

where
T=torque (reaction of the actuator seek torque),
J=disc drive inertia, and
α=angular acceleration of the disc drive about the axis 410 (which is parallel to the axis of the spindle and the actuator)

Thus, for a given seek torque, the angular acceleration, α, decreases as the inertia of the disc drive 100 increases. In other words, by increasing the inertia of the disc drive 100, the rotational vibration index is decreased. The rotational vibration index is a measurement of the angular acceleration of the disc drive 100 mounted in a chassis. The moment of inertia of any sort of bodies, such as a disc drive 100, is determined by integrating the distance squared of each particular mass away from the axis of rotation. Thus, the moment of inertia increases as the mass is moved away from the axis of rotation. As shown in FIG. 4, axis 410 is in the middle of the disc drive. The actual axis of rotation may vary somewhat from this particular location for different models of disc drives. The idea of the inertia ring 500 is two-fold. First of all, an increased mass results in a decreased acceleration of the disc drive 100, also known as the head disc assembly ("HDA"). In addition, the mass that is added to the disc drive is preferably added at the outer periphery of the disc drive so as to increase the moment of inertia of the disc drive. When the actuator 118 applies a force to the disc drive 100, the resulting torque produced to counteract the torque caused by the actuator assembly 118 will have a lower angular acceleration since the moment of inertia is maximized by placing the mass of the inertia ring 500 toward the outer periphery 430 of the disc drive 100.

It should also be noted that the force on the disc drive 100 does not necessarily have to come from the actuator assembly 120 being driven during seeks. Other forces can also act on the disc drive 100. For example, in many applications, more than one disc drive is mounted in a rack. One such application is for a redundant array of drives ("RAID"). In a RAID application, the seeks done by adjacent drives may produce a force on a drive 100. The drive 100 still will produce a reactionary force, as represented by arrow 420, and having an increased mass as well as an increased moment of inertia will cause the base or the HDA to move less. The end result is that there will improved positioning and less write faults.

Figure 5:
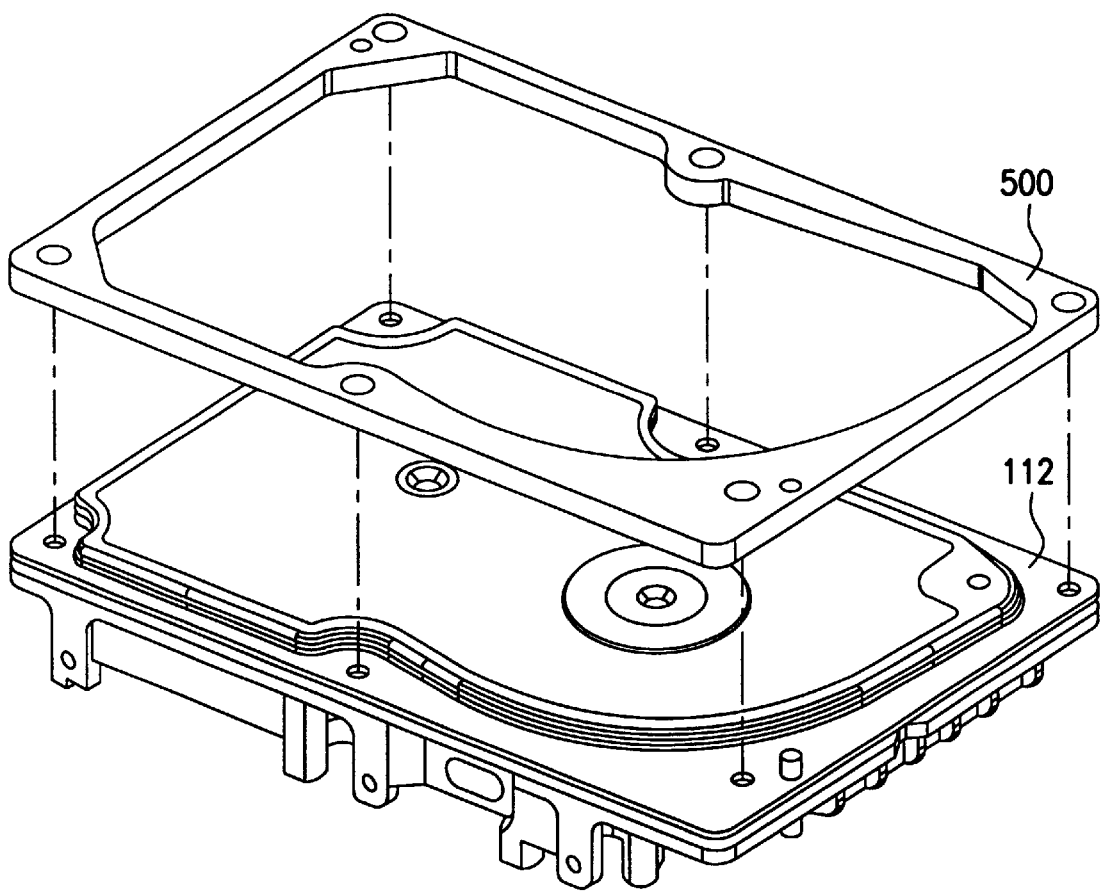
FIG. 5 is an exploded isometric view of the inertia ring and the base of the disc drive.

FIG. 5 shows an exploded view of another model of disc drive 100. The model of disc drive 100 shown in FIG. 5 is different than the model of the disc drive shown in FIG. 1. The disc drive 100 shown in FIG. 5 includes an inertia ring 500 which is attached to the base 112 of the disc drive. The inertia ring 500 is attached to the base 500 using a set of fasteners. The inertia ring 500 is made of a material such as steel or zinc any other high density material. The inertia ring may be treated so that it will not produce oxide particles. In this particular application, the inertia ring 500 is positioned outside of the head disc enclosure. The head disc enclosure is the controlled environment that results from the cover 114 (shown in FIG. 1) being placed on the base 112. Generally, the disc or discs 134, the actuator assembly 120 and the voice coil motor are positioned within the head disc enclosure. The head disc enclosure is generally sealed and may or may not have a breather filter into which make-up air can be obtained for the head disc enclosure. The actuator assembly 120, the disc or discs 134, and the voice coil motor 130, 131 and 128 are not shown in FIG. 5, but are shown in FIG. 1.

Figure 6:
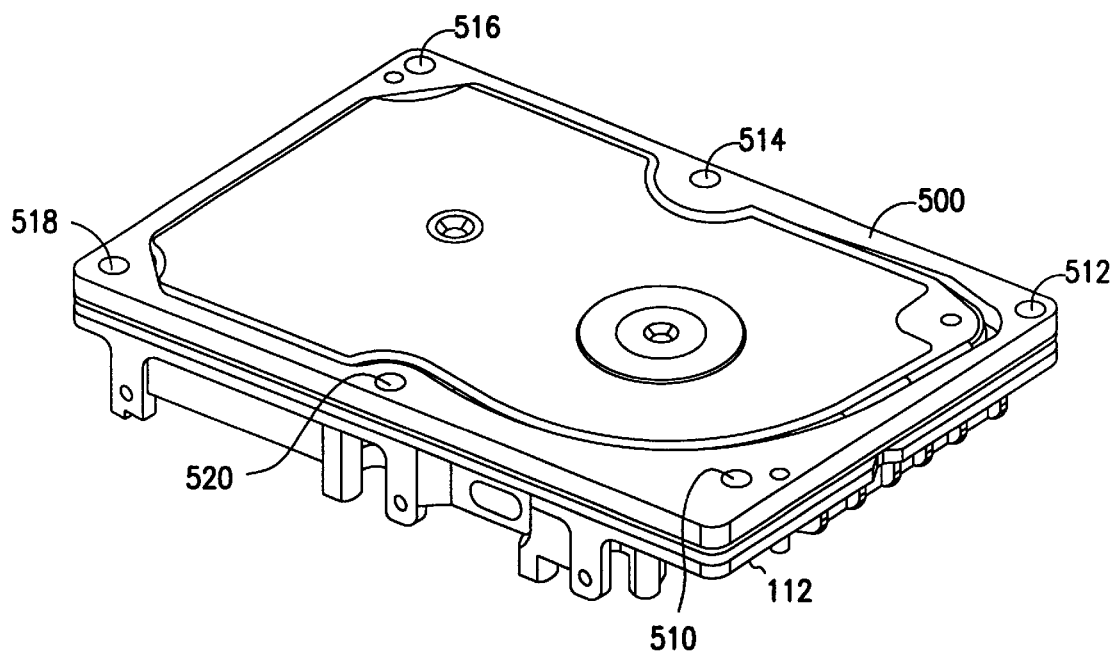
FIG. 6 is an isometric view of the inertia ring attached to the base of the disc drive.

FIG. 6 is an isometric view of the inertia ring 500 attached to the base of the disc drive 100. As shown in FIG. 6, the inertia ring 500 is provided with openings that will receive screws or other appropriate fasteners (not shown in FIG. 6). The fasteners will be used to attach the inertia ring 500 to the base 112 of the disc drive 100. The openings in the inertia ring are depicted by reference numerals 510, 512, 514, 516, 518, and 520. It should also be noted that the inertia ring may be sandwiched between the cover 114 and the base plate 112. In other words, the inertia ring 500 could be dimensioned so that the cover 114 could sealingly engage the base 112 to form a sealed head disc enclosure while at the same time, fixedly attaching the inertia ring 500 to the disc drive 100. In this instance, the openings 510, 512, 514, 516, 518 and 520 may not be threaded, but would allow threaded fasteners to pass through the inertia ring 500 and engage threaded openings in the base plate 112.

Figure 10:
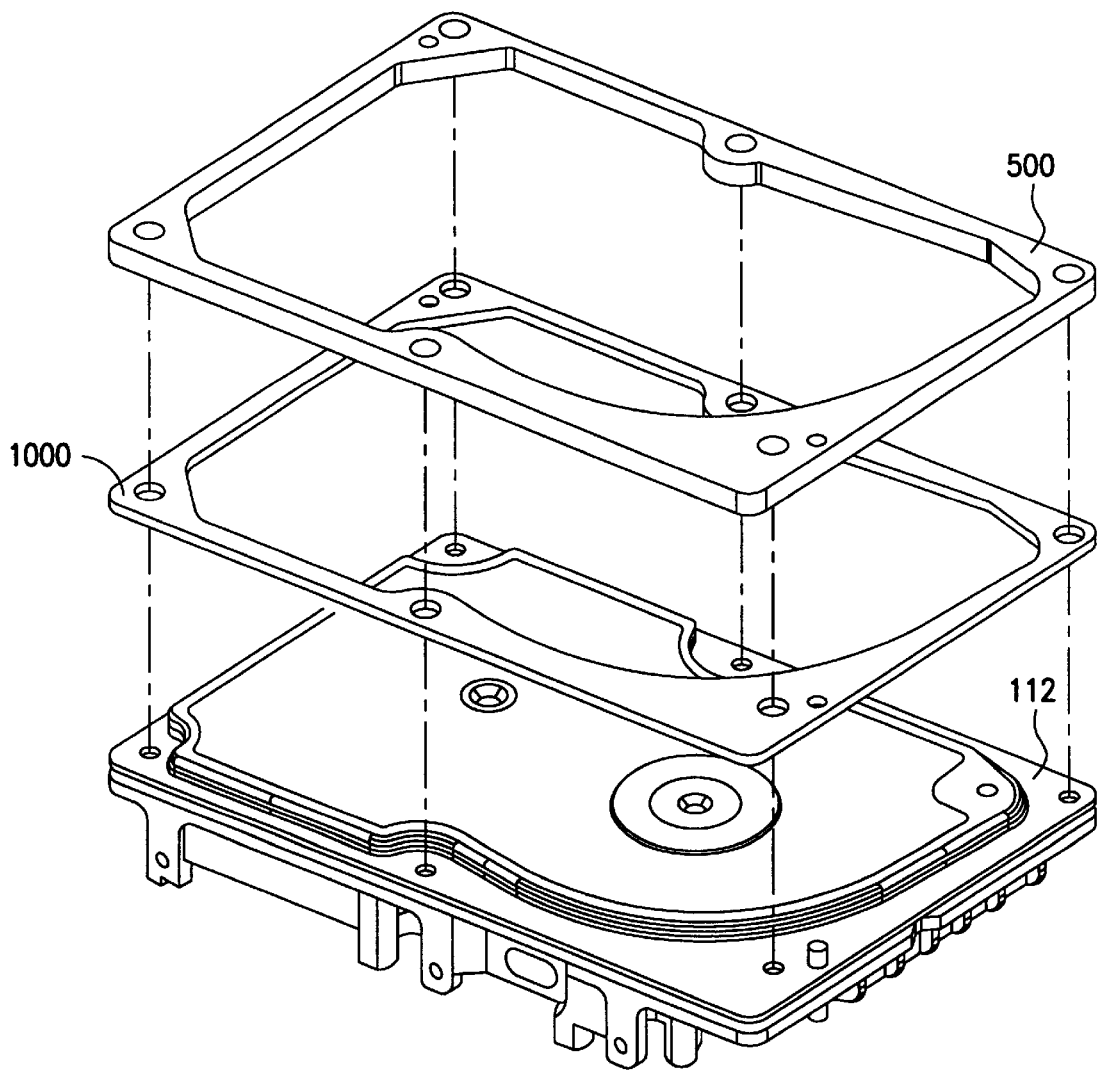
FIG. 10 is an exploded isometric view of the inertia ring, a dampening member, and the base of the disc drive.

FIG. 10 illustrates another method of attachment of the inertia ring 500 to the base 114 of the disc drive 100. In this embodiment, a dampening element 1000 is placed between the base 112 and the inertia ring 500. The dampening element 1000 is not limited to a separate element shown. The dampening element could also be an adhesive having dampening characteristics or a viscoelastic tape used to fasten the inertia ring 500 to either the base 112 or to the cover 114 of a disc drive 100. Using a dampening element 1000, such as viscoelastic tape, results in better performance in terms of write errors since the dampening element dissapates energy due to the shearing effect caused by the motion between the base or cover and the inertia ring 500.

Figure 7:
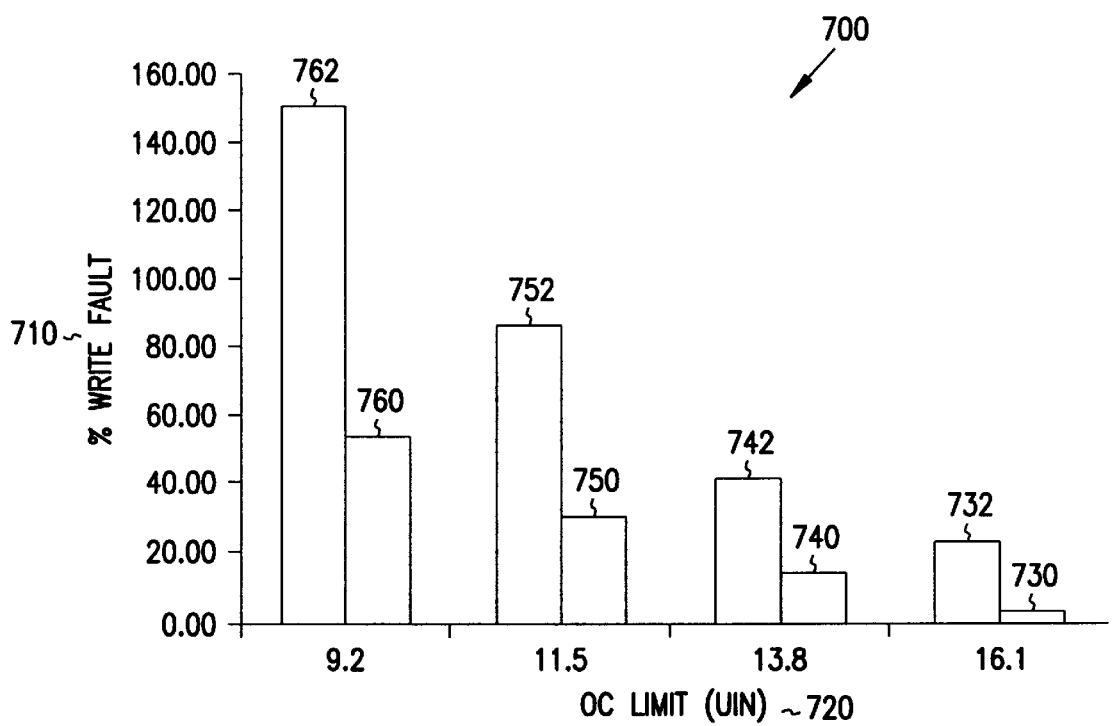
FIG. 7 is a graph showing test results of various disc drives with the inertia ring and without the inertia ring.

FIG. 7 is a graph showing the test results of using an inertia ring 500 as the on-cylinder limit in micro inches is reduced for a particular disc drive 100. The graph 700 is the average number of write faults per write command in the disc drive. In other words, if the disc drive is commanded to do a write operation and there is 100% write fault, it means that for every write operation that the disc is commanded to do, one write fault will occur. The Y axis 710 of the graph 700 represents the percentage of write faults. The X axis 720 represents the on-cylinder limit which is set for the disc drive. The term "on-cylinder limit" is defined as the distance off the track center that the transducer is allowed to be positioned. Each track has a center and a transducer ideally is flown over the center of that track during a write operation. As a practical matter, it is difficult to always maintain the transducer on the center of the track and, therefore, a measurement in microinches of the distance off the center of the track is provided. For a given track width, the transducer can be off the track center while writing and still not produce a write fault. When the transducing head falls outside of the on-cylinder limit a write fault will occur. A write fault is where the threshold for writing is exceeded and writing is prohibited. In the graph of the average write fault 700 shown in FIG. 7, there are a number of on-cylinder limits presented. For each on-cylinder limit, there is a first bar that represents the percentage of write faults without the inertia ring 500 and another bar that represents the percentage of write faults of the drive when the inertia ring 500 is used. For example, with an on-cylinder limit of 16.1 without the inertia ring 500, the percentage write fault represented by bar 732 is approximately 20%. When the inertia ring 500 is used, the percentage write fault drops to approximately 3%. When the on-cylinder limit is reduced to 13.8 microinches, the percentage of write faults represented by bar 742 is at approximately 40%, while the percentage of write faults when an inertia ring 500 is used is dropped to below 20%, as represented by bar 740. When the on-cylinder limit drops to 11.5 microinches, the percentage of write faults that occur without the inertia ring increases to approximately 80%. In other words, 80% of the time during a write command, the transducer will pass outside the range of 11.5 microinches or outside the on-cylinder limit. In this instance, there is a high probability that a write fault could occur. This is dramatically reduced by using an inertia ring as represented by bar 750. The percentage write faults with the inertia ring in place drops to approximately 30%. When the on-cylinder Limit in microinches is dropped to 9.2 microinches, the percentage of write faults jumps to 150% when an inertia ring 500 is not used. Using the inertia ring 500 drops the write fault percentage to approximately 50% as represented by bar 760 in graph 700 of FIG. 7. It should be noted that decreasing the on-cylinder limit in microinches represents a decrease in the track width over time for a particular model of disc drive. By decreasing the track width, the track density is increased and the amount of data that can be stored on the disc drive 100 is increased. Thus, by looking at FIG. 7, one can see that if the inertia ring 500 is not used, the percentage write faults for a particular disc drive would increase dramatically. Also, FIG. 7 shows that as the inertia ring is used, the percentage write faults is placed into a lesser percentage. FIG. 7 also represents that as the disc drive designs go to thinner and thinner tracks or to higher and higher densities, the use of an inertia ring will be more drastically needed.

Figure 8:
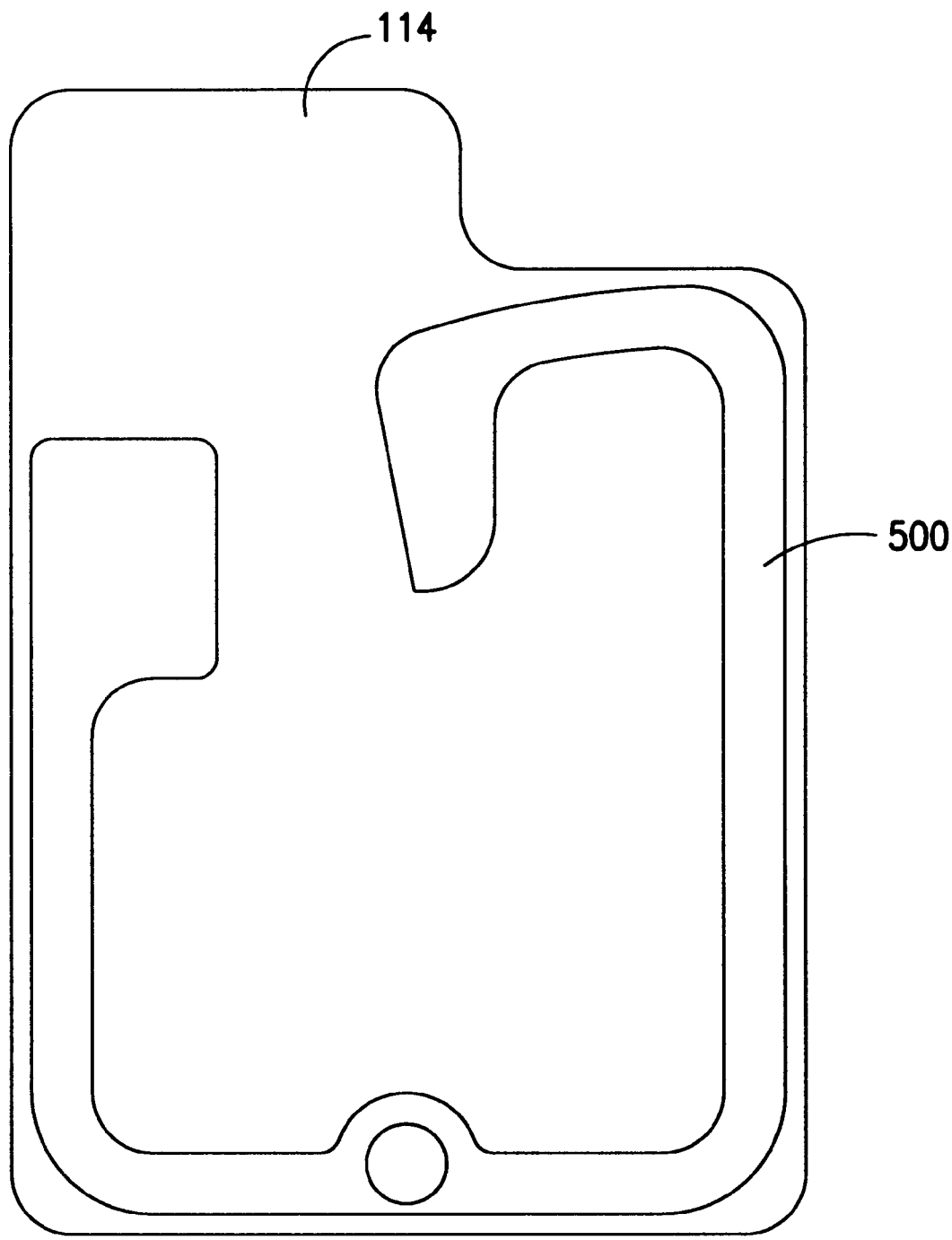
FIG. 8 is a bottom view of cover 114 from FIG. 1 with the inertia ring 500 attached thereto.

FIG. 8 shows another embodiment of the inertia ring 500. In FIG. 8, the cover 114 from FIG. 1 is shown from the bottom. The inertia ring 500 is attached to the cover. It should be noted that the inertia ring 500 can be attached using adhesive or a viscoelastic tape or can be screwed or fastened otherwise to the cover 114. In this particular instance, this also shows that the inertia ring 500 can be placed within the disc drive enclosure. It should be-noted that the inertia ring 500 placed inside a disc drive enclosure must be treated or must be made of a material that will not generate particles and cause disc crashes.

Figure 9:
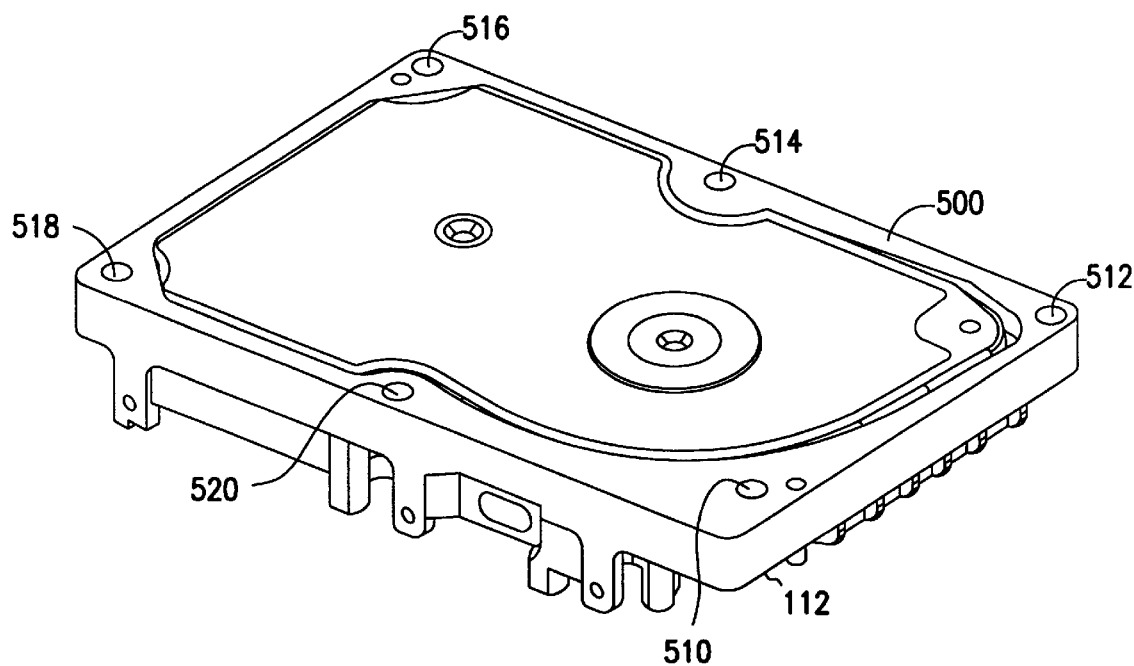
FIG. 9 is an isometric view of a disc drive having an integral inertia ring in the base of the disc drive.

In still another embodiment, shown in FIG. 9, the base plate 112 or the cover 114 can be made with an integral inertia ring 500. In this particular instance, the base plate would be formed with a material basically of a first density as well as a material of a second density. The material with the second density would be placed toward the outer periphery 430 of the disc drive 100 in either the cover 114 or the base 112. It should also be noted that tile inertia ring 500 even when separate is generally made of a much more dense material than the base plate 114 or cover 114 or any other material used to make the disc drive 100.

Advantageously, the inertia ring reduces the vibration of the magnetic disc apparatus from the driving reaction force to tie voice coil motor. In other words, the added mass and position of the mass near the periphery of the disc drive makes it less susceptible to the reaction forces. Settling characteristics after a seek from a first track on the disc to a target track on the disc is improved. Track following operations of the disc drive are also improved. The disc drive has less relative motion between the actuator assembly and the base while under any type of servo control which implements course corrections using a driver such as a voice coil motor. The solution is also static. In other words, the inertia ring does not move substantially with respect to the remaining portion of the disc drive. As a result, the disc drive is more reliable over its life. The addition of the inertia ring to the disc drive during manufacture can easily be accommodated using current assembly techniques.

Figure 11:
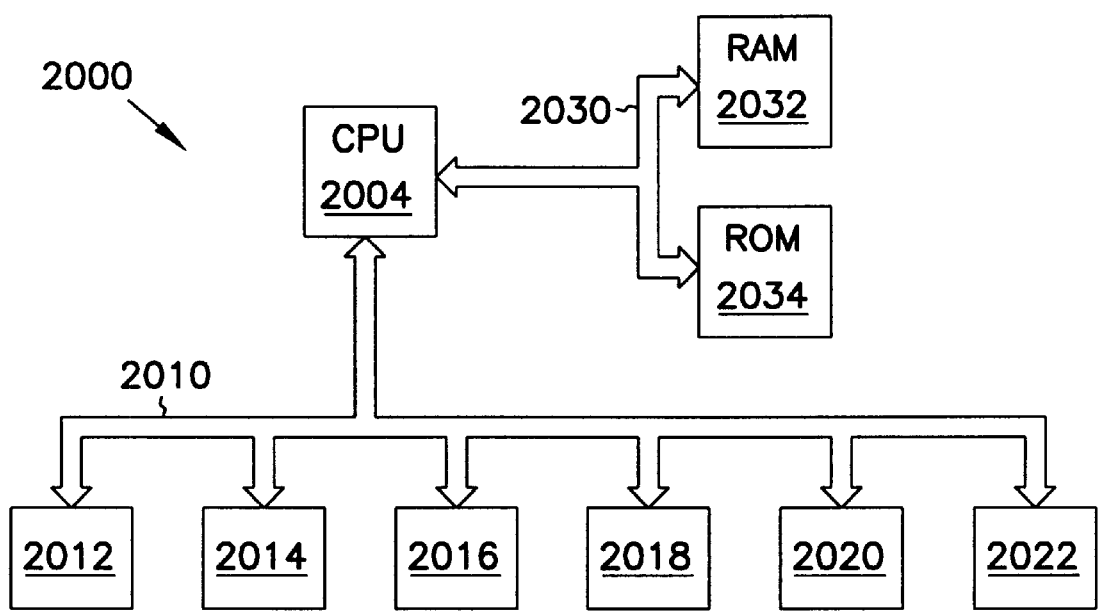
FIG. 11 is a schematic view of a computer system.

FIG. 11 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

In conclusion, a disc drive 100 includes a base 112 and an actuator 120 rotatably attached to the base 112. The actuator 120 having a first end and a second end. A voice coil 128 is attached to one end of the actuator 120. A transducer 150 is attached to the other end of the actuator 120. A magnet 130, 131 is attached to the base 120. The magnet 130, 131 and voice coil 128 form a voice coil motor for driving the actuator 120. An inertia arm 500 is attached to the base 112 to increase the moment of inertia of the disc drive 100. The inertia ring 500 is fixed with respect to the base 112. In one embodiment, the disc drive 100 also includes a cover 114. The inertia ring 500 is attached to the base 112 via the cover 114. The inertia ring may be formed integral with the base 112. The base 112 is formed of a first material and the inertia ring 500 is formed of a second material. The first material has a first density and the second material has a second density. A dampening material may be used to attach the inertia ring 500 to the base 114. The inertia ring 500 is formed so that most of the material is positioned near the outer periphery of the disc drive 100. The inertia ring 500 is formed to increase or maximize the moment of inertia of the disc drive. The inertia ring 500 may also be formed to fill voids in the disc drive 100 between the base 112 and the cover 114.

A disc drive 100 includes a base 112 and a disc 134 rotatably attached to the base 112. The disc drive also includes an actuator assembly 120 rotatably attached to said base 112 and a device 128, 130, 131 for moving the actuator assembly. A cover 114 is attached to the base 112. The combination of the cover 114 and base 112 form a disc enclosure 112, 114 for enclosing the disc 134, the actuator assembly 120 and the device for moving the actuator assembly 120. An inertia ring 500 is attached to the disc enclosure for increasing the moment of inertia of the base 112 and cover 114. The inertia ring 500 may be attached to the cover 114 or to the base 112. The inertia ring 500 may be formed of a material which is more dense than the cover 114 or more dense than the base 112. The inertia ring 500 may also be formed integral with the base 112 or the cover 114. The inertia ring 500 may also be formed such that the material is positioned near the periphery of the base 112 and attached cover 114. In addition, the inertia ring 500 may be formed to attach to the cover 114 and such that the material fills a void between the disc and the attached.

In general, the inventive disc drive 100 includes a head disc enclosure, and a device for increasing the inertia of the head disc enclosure attached to the head disc enclosure.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:

a base;

a disc rotatably attached to the base;

an actuator assembly rotatably attached to the base;

a cover attached to the base, the cover and base forming a disc enclosure for enclosing the disc and the actuator assembly; and an inertia ring operably coupled to the disc enclosure for increasing inertia moment of the disc enclosure, wherein the inertia ring is formed of a material which is more dense than at least one of the base or the cover.

2. The disc drive of claim 1 wherein the inertia ring is formed integral with the base.

3. The disc drive of claim 1 wherein the inertia ring is formed integral with the cover.

4. The disc drive of claim 1 wherein the inertia ring is formed such that the material is positioned near the periphery of the base and the cover.

5. The disc drive of claim 1 wherein the inertia ring is formed such that the material fills a void between the disc and the cover.

6. The disc drive of claim 1 wherein the inertia ring is attached to the cover.

7. A disc drive comprising:

a base that is comprised of a first material;

side walls extending substantially orthogonal to the base; and an inertia ring operably coupled to the base to increase inertial moment of the disc drive that is comprised of a second material, in which the second material is more dense than the first material.

8. The disc drive of claim 7 in which the inertia ring is integral with the base.

9. The disc drive of claim 7 further comprising a top wall attached to the side walls to form an enclosure with the side walls and the base.

10. The disc drive of claim 9 in which the second material comprising the inertia ring is more dense than the top wall.

11. The disc drive of claim 9 in which the inertia ring is formed integral with the top wall.

12. The disc drive of claim 11 further comprising a dampening material positioned between the inertia ring and the base.

* * * * *